(12) United States Patent
Benamrouche

(10) Patent No.: US 10,536,660 B2
(45) Date of Patent: Jan. 14, 2020

(54) METHOD FOR PARAMETERISING THE RESPONSIVENESS OF AN ELECTRONIC DEVICE OBSERVED AFTER RECEIVING A COMMAND EMITTED BY A NEAR BY TESTING SYSTEM AND DEVICE SUITABLE FOR IMPLEMENTING SUCH A METHOD

(71) Applicant: SAGEMCOM BROADBAND SAS, Rueil Malmaison (FR)

(72) Inventor: Farid Benamrouche, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/751,754

(22) PCT Filed: Jul. 21, 2016

(86) PCT No.: PCT/EP2016/067376
§ 371 (c)(1),
(2) Date: Feb. 9, 2018

(87) PCT Pub. No.: WO2017/025290
PCT Pub. Date: Feb. 16, 2017

(65) Prior Publication Data
US 2018/0234658 A1  Aug. 16, 2018

(30) Foreign Application Priority Data
Aug. 10, 2015  (FR) ..................................... 15 57653

(51) Int. Cl.
*H04N 5/44* (2011.01)

(52) U.S. Cl.
CPC ... *H04N 5/4403* (2013.01); *H04N 2005/4432* (2013.01); *H04N 2005/4444* (2013.01)

(58) Field of Classification Search
CPC ........ H04N 5/44; H04N 5/445; H04N 5/4403; H04N 2005/4432; H04N 2005/4444
USPC ...................... 348/734, 563, 552; 341/24, 26
See application file for complete search history.

(56) References Cited

U.S. PATENT DOCUMENTS

| 3,886,543 | A | * | 5/1975 | Marin | H03K 3/013 327/386 |
| 7,218,250 | B2 | * | 5/2007 | Laliberte | H03K 5/1254 341/22 |
| 7,446,676 | B2 | * | 11/2008 | Suen | H03M 11/20 341/22 |
| 8,421,931 | B2 | * | 4/2013 | Park | G08C 17/00 348/734 |

(Continued)

OTHER PUBLICATIONS

International Search Report as issued in International Patent Application No. PCT/EP2016/067376, dated Nov. 9, 2016.

*Primary Examiner* — Trang U Tran
(74) *Attorney, Agent, or Firm* — Pillsbury Winthrop Shaw Pittman LLP

(57) ABSTRACT

A method for parameterising the responsiveness of an electronic device observed after the electronic device receives a command emitted by a nearby testing system including a plurality of control buttons, includes establishing a usage profile of the nearby testing system by an operation to analyze operations of pressing the control buttons of the nearby testing system; and adapting a parameter of the responsiveness of the electronic device in accordance with the established usage profile.

14 Claims, 2 Drawing Sheets

(56) References Cited

U.S. PATENT DOCUMENTS

| | | | |
|---|---|---|---|
| 9,892,064 B2* | 2/2018 | Holzbecher | G06F 13/105 |
| 2008/0246634 A1 | 10/2008 | Alberth et al. | |
| 2012/0281143 A1 | 11/2012 | Chow et al. | |

* cited by examiner

METHOD FOR PARAMETERISING THE RESPONSIVENESS OF AN ELECTRONIC DEVICE OBSERVED AFTER RECEIVING A COMMAND EMITTED BY A NEAR BY TESTING SYSTEM AND DEVICE SUITABLE FOR IMPLEMENTING SUCH A METHOD

CROSS-REFERENCE TO RELATED APPLICATIONS

This is the U.S. National Stage of PCT/EP2016/067376, filed Jul. 21, 2016, which in turn claims priority to French Patent Application No. 1557653, filed Aug. 10, 2015, the entire contents of all applications are incorporated herein by reference in their entireties.

TECHNICAL FIELD OF THE INVENTION

The purpose of the present invention is to provide a method for parameterising the responsiveness of an electronic device, which reactivity is observed, noticed, after a control emitted from a neighbouring monitoring piece of equipment, for example from a remote control, is received. The invention is also concerned with an electronic device able to implement such a method for parameterising the responsiveness of an electronic device.

The field of the invention is generally that of electronic devices controlled by a neighbouring electronic piece of equipment, typically a remote control. By neighbouring electronic piece of equipment, it is meant, for a given electronic device, an electronic equipment which is used to transmit controls from the equipment to the electronic device, the piece of equipment's user being located at a limited distance from the electronic device such that he/she can directly notice, by viewing or hearing and without the transmission means intervening, on the electronic device considered that controls that he/she passes by means of the neighbouring monitoring piece of equipment are taken into account.

The considered neighbouring pieces of equipment are pieces of equipment which enable controls to be passed to the electronic device associated therewith by means of control keys, said control keys possibly being for example control buttons a user's pressure on which causes the emission of a control, or tactile buttons—or keys. It can be for example remote controls of audio/video devices, but also smart phones equipped with specific applications for controlling such devices.

The purpose of the invention is to improve the usage comfort of an electronic piece of equipment, in particular of the remote control type, by adapting to usage habits of a user, the reactivity of an electronic device controlled by the electronic piece of equipment considered.

Technological Background of the Invention

In the state of the art, different systems are known, which provide methods for adapting to the user electronic pieces of equipment controlling neighbouring electronic devices.

For example, a method is known enabling a combination of keys a user often reproduces on his/her remote control to be marked; the user is then suggested to use a specific key of his/her remote control acting as a hot key to this combination of keys. A combination of keys cumbersome to make is thus replaced by a single depression on a single key.

On the other hand, in the state of the art, no method is known enabling a user's habits to be taken into consideration when using a control electronic piece of equipment, typically a remote control, of an electronic device to make the piece of equipment usage comfortable, efficient, when passing controls.

It is thus frequent that a remote control user successively depressing different keys of a monitoring piece of equipment, or even a single key several times, notices that some depressions on the keys considered are not taken into account by the electronic device associated with the monitoring piece of equipment. He/she must then depress again the same keys, possibly after he/she has corrected the controls actually taken into account but not in the right order, such that the controls he/she wished to pass are actually taken into account by the electronic device.

Thus, for example, a user wishing to select, by means of his/her remote control, the channel 1146 on its digital TV set top box, will successively depress the keys 1, 1, 4 and 6. If this sequence is dialled too quickly, only the controls 1, 4 and 6 will be taken into consideration. The second "1" will not have been taken into account by the digital TV set top box. The explication of this control not being taken into account lies in that the debouncing system implemented in such devices: the debouncing system filters the reception of some controls when they are emitted too close to each other. Thus, for example, two successive depressions on the key "1" spaced by a time interval lower than 150 milliseconds (debouncing period of time in this example) will result in the second control "1" not being taken into account by the electronic device.

The same is true upon continuously depressing a control key of the remote control type equipment, a continuous depression being interpreted by the electronic device receiving the control as a succession of identical controls received, in principle with regular time intervals, said regular time intervals being spaced by a period of time lower than the debouncing value.

Another exemplary unsatisfactory use of a monitoring piece of equipment is now described: a user which uses his/her remote control in a low-energy way will tend to continue the depression some time on each control key of his/her remote control. Some depressions on remote control keys can thus be interpreted by the electronic device as several successive depressions, in particular if the debouncing period of time is a relatively long time. The user should then regularly correct the controls received repeatedly by the electronic device, whereas this control repetition would not correspond to his/her will.

In the same way, some control pieces of equipment have control keys which take an intensity of depressing the key considered into consideration; the depressing intensity is a piece of information which has an incidence on the control operation received, in particular by converting this depressing intensity into a number determined beforehand of identical controls received by the electronic device: the higher the intensity of depressing the control key "turn up sound level" is, the quicker the sound level will be turned up within the electronic device; everything is as if said device was receiving the turn up sound level instruction a number of times increasing in the same direction as the depressing intensity increase.

The adjustment of such a system sensitive to the intensity of depression on a control key sometimes does not correspond to users use, some of them naturally depressing strongly on the control keys, and some others less strongly. No system of the state of the art foresees take such use specificities into account.

General Description of the Invention

The method according to the invention provides a solution to the problems and drawbacks just set out. In the invention, a solution is provided to adapt the responsiveness of an electronic device receiving controls from a neighbouring monitoring piece of equipment as a function of usage practices of this piece of equipment.

Further, in the invention, it is foreseen to determine information about the usage of the distant equipment, on the use of control keys, in particular relating to a frequency of depressing these keys and/or a depressing intensity in order to determine a value of a responsiveness parameter of the electronic device associated, in particular a debouncing value and/or a parameter directly depending on an intensity of depressing at least one key of the monitoring piece of equipment.

The invention thus essentially relates to a method for parameterising the responsiveness of an electronic device observed after the electronic device has received a control emitted from a neighbouring monitoring piece of equipment comprising a plurality of control keys, said method being characterised in that it comprises the different steps of:
  establishing a usage profile of the neighbouring monitoring piece of equipment by an operation of analysing operations of depressing the control keys of said neighbouring monitoring piece of equipment;
  adapting a responsiveness parameter of the electronic device as a function of the usage profile established.

The method according to the invention can comprise, in addition to the main steps just mentioned in the preceding paragraph, one or more of the further characteristics from the following ones:
  the responsiveness parameter is a debouncing period of time associated with a debouncing system, said debouncing period of time being assigned to a set of keys from the plurality of control keys of the neighbouring monitoring piece of equipment;
  the step of establishing a usage profile comprises the operation of detecting a first sequence consisting in depressing a control key considered immediately followed by a step of cancelling said control—the step of adapting the responsiveness parameter thereby consisting in modifying the debouncing period of time, by increasing it, for at least one of the control keys considered of the first sequence;
  depressing the cancel key is consecutively repeated three times before conducting the step of adapting the responsiveness parameter;
  the step of establishing a usage profile comprises the operations of detecting: —a second sequence consisting in an extended depression on a control key considered or successive depressions on the control key considered; an operation of removing by the debouncing system, at least one pulse caused by said extended depression or by said successive depressions on the control key considered; —a new depression on the control key considered causing a pulse not removed by the debouncing system, said new depression occurring without the occurrence of any other depression on a key other than the key considered since the removal operation; —the step of adapting the responsiveness parameter thereby consisting in modifying the debouncing period of time, by decreasing it, for at least the control key considered;
  the number of pulses removed by the debouncing system is higher than or equal to three;
  adapting the responsiveness parameter consists in modifying the debouncing period of time for a plurality of control keys associated by the debouncing system with each control key considered;
  modifying the debouncing period of time consists in a stepped modification, each step being between ten and twenty-five milliseconds;
  the debouncing period of time to be applied to at least one control key considered is adapted as a function of measures established between consecutive pressures among different control keys to which said control key considered belongs;
  the responsiveness parameter is a parameter whose value is correlated with the intensity of depressing a control key considered of the neighbouring monitoring piece of equipment, said value giving a number of repetitions of the control associated with the control key considered to be applied in the electronic device when said control key considered is depressed;
  the step of establishing a usage profile comprises the operation of detecting a third sequence consisting in depressing a control key considered immediately followed by depressing a key of cancelling said control; —the step of adapting the responsiveness parameter thereby consisting in modifying, by decreasing it, for a given intensity of depressing the control key considered, the number of repetitions of said control to be applied in the electronic device when said control key considered is depressed;
  depressing the cancel key is consecutively repeated three times before conducting the step of adapting the responsiveness parameter;
  the step of establishing a usage profile comprises the operation of detecting a fourth sequence consisting in an extended depression on a control key considered, followed by a new depression on said control key considered; —the step of adapting the responsiveness parameter thereby consisting in modifying, by increasing it, for a given intensity of depressing the control key considered, the number of repetitions of said control to be applied in the electronic device when said control key considered is depressed.

The different further characteristics of the method according to the invention, insofar as they do not exclude each other, are combined according to all the association possibilities to result in different exemplary implementations of the invention.

The present invention is also concerned with an electronic device adapted to implement the method according to the invention, for parameterising the responsiveness of said electronic device observed after the electronic device has received a control emitted from a neighbouring monitoring piece of equipment comprising a plurality of control keys, said device comprising
  means for establishing a usage profile of the neighbouring monitoring piece of equipment by an operation of analysing operations of depressing the control keys of said neighbouring monitoring piece of equipment;
  means for adapting a responsiveness parameter of the electronic device as a function of the usage profile established. The device according to the invention is advantageously a digital TV set top box.

The invention and its different applications will be better understood upon reading the description that follows and upon examining the accompanying figures.

BRIEF DESCRIPTION OF THE FIGURES

These are only shown by way of indicating and in no way limiting purposes of the invention. The figures show.

DESCRIPTION OF PREFERRED EMBODIMENTS OF THE INVENTION

Unless otherwise indicated, different elements appearing on several figures will keep the same reference.

Figure 1:
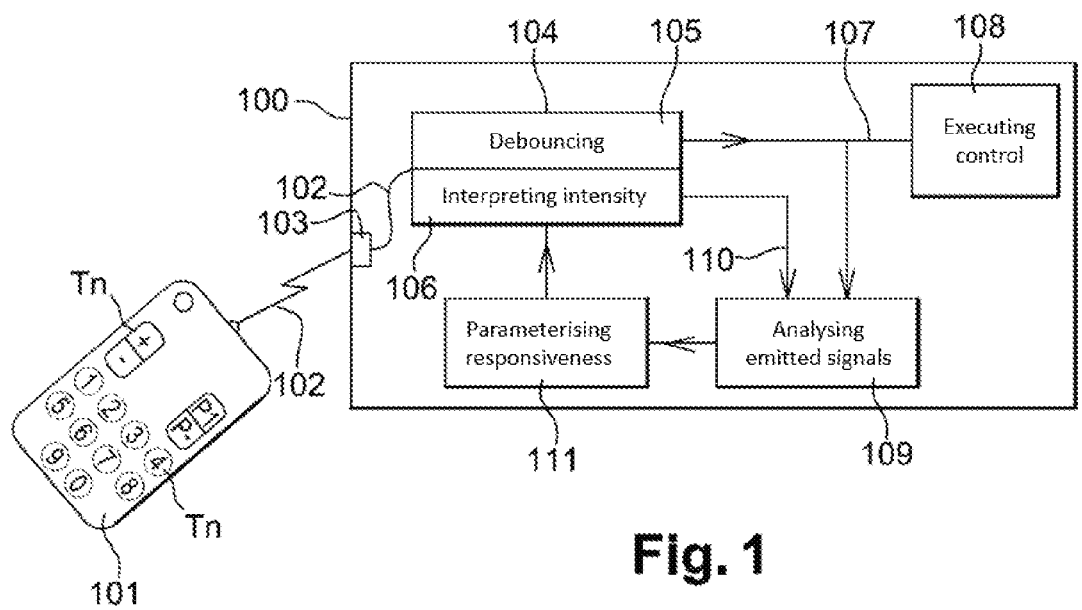
in FIG. 1, a schematic representation of the device according to the invention, within a context of implementing the method according to the invention.

In FIG. 1, an electronic device 100 according to one exemplary embodiment of the invention is represented. The electronic device 100 is typically an audio-video piece of equipment, or a peripheral of this piece of equipment type. In advantageous examples of application of the invention, the device 100 is a digital TV set top box, or even a TV set.

The electronic device 100 receives controls from a neighbouring monitoring piece of equipment 101. The neighbouring monitoring piece of equipment 101 is for example a remote control, or even a device on which an application for emitting controls for controlling the electronic device 100 is installed. The neighbouring monitoring piece of equipment 101 comprises control keys Tn which are for example buttons on which a pressure should be exerted to emit an associated control, or tactile keys in the case where the piece of equipment 101 comprises a touch screen.

Each depression on a control key Tn is reflected by the emission to the device 100, for example as an infrared signal 102, of a control to be executed by said device 100. The latter has one or more suitable receivers 103 therefor.

The control signals 102 received by the electronic device 100 are processed, within the device 100, by a module 104 called a responsiveness management module. The responsiveness management module 104 comprises at least one functionality from the following systems:

a debouncing system 105. The debouncing system 105 provides removal of controls received by said module which would have a too low time deviation with respect to the immediately preceding control. For two consecutive pulses for which the time deviation is lower than a value determined beforehand, called a debouncing value, the second pulse will not be executed by the device 100. For example, for a user depressing five times the key T1 of the piece of equipment 101, only three depressions will be actually taken into account and executed by the device 100 if two of the depressions are made too close to preceding depressions. The debouncing system 105 is thus likely to remove some control pulses; it stores a piece of information relating to these removed controls.

a so-called intensity interpreting system 106. The system 106 provides conversion between the intensity of a depression exerted by the user on a key Tn of the piece of equipment 101 and a number of controls associated with said key Tn to be taken into consideration by the device 100. Thus, the stronger a user presses one of the keys Tn, the higher is the number of controls corresponding to the key Tn taken into account by the device 100.

The responsiveness management module 104 thus lets pass processed signals 107 therethrough, filtered by the debouncing system or even converted into a certain number of pulses by the system 106, which are communicated to a module 108 for executing the control signals. The module 108 manages to take these processed signals 107 received into account by the device 100 and ensures interpretation, in particular interpretation and execution of the corresponding controls.

In the meantime, the processed signals 107 are transmitted, within the device 100, to a module 109 called a module for analysing the signals emitted by the neighbouring equipment 101; the module 109 also receives processing information 110 communicated by the responsiveness management module 104. In the case where the debouncing system is used in the responsiveness management module 104, the processing information 110 indicates for example the number of pulses, corresponding to depressions on the piece of equipment 101, which have been removed—as well as the non-removed pulses.

The module 109 then conducts an analysis of the processed signals 107 and the processing information 110 to determine a parameterising 111 of the responsiveness management module 104. The parameterising 111 performed enables a usage profile of the piece of equipment 101 to be established and determines adjustments to provide to the responsiveness ensured in particular by the debouncing system 105 and the intensity interpreting system 106 such that the usage of the piece of equipment 101 is made more comfortable to the user. It enables for example the number of useless corrections, or repetitions the user will exert on his/her monitoring piece of equipment 101 to be limited.

The parameterising information 111 thus established are transmitted to the responsiveness management module 104 such that they are taken into account in the different systems the module 104 implements.

Different examples of the general method according to the invention just described are now illustrated by means of FIGS. 2 to 5. In these figures, the operations performed by the module 109 of the signals emitted by the neighbouring piece of equipment 101, which module 109 receives as an input the processed signals 107 and the processing information 110, are particularly pointed out.

Figure 2:
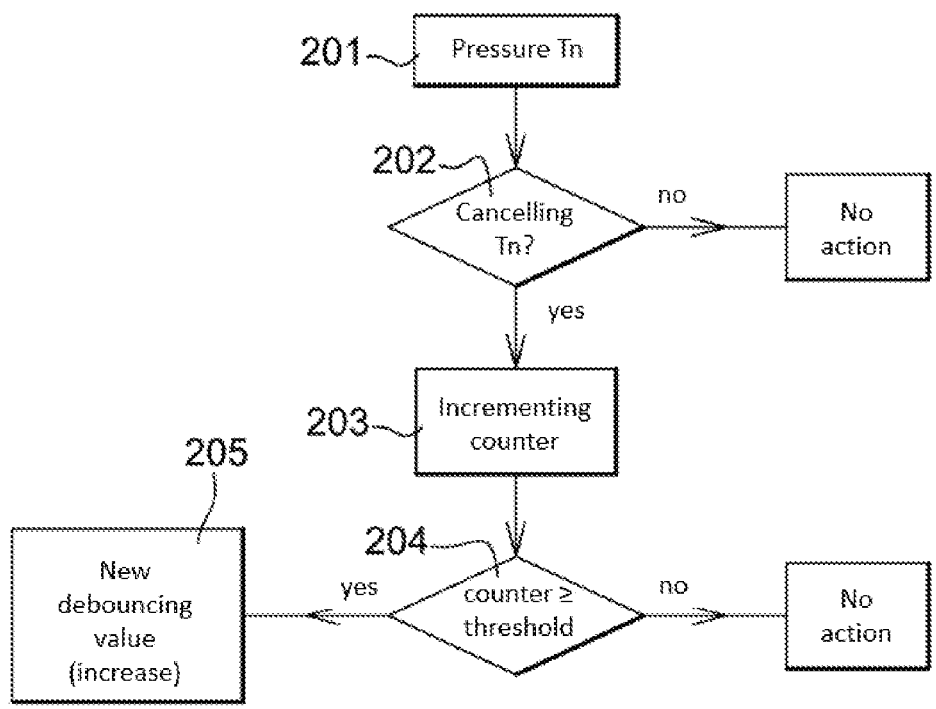
in FIG. 2, a block diagram illustrating a first example of implementing the method according to the invention.

In FIG. 2, it is considered that the responsiveness management module 104 implements the debouncing system 105. In this example, in a first step 201, a first pressure of a key Tn of the piece of equipment 101 is detected.

In a following step 202, it is detected whether the pressure of the key Tn, which is extended or repeated several times, is immediately followed by a depression on a key for cancelling the key Tn. If not, no action is taken. The terms "immediately followed" designate the fact that there has been no depression on another key which would be inserted between the pressure on the key Tn and the pressure on the key for cancelling the key Tn. A cancelling key is a key which makes sure that the electronic device 100 will not to take the previous depression on the key Tn into account. For example, the sound level turn-up key has as a cancel key, the sound level turn-down one. An alphanumeric key has as a cancel key, the "correction" key of the piece of equipment 101.

If the pressure of the key Tn is actually immediately followed by a depression on the cancel key, by incrementing a counter in a step 203, the number of cancel controls thereby received to cancel the pressure on the key Tn is counted. The counter is reset as soon as a key other than the key for cancelling the key Tn is depressed.

In a following step 204, the number of controls for cancelling the previous counter is compared to a threshold value determined beforehand. This number is higher than or equal to 1. If the threshold value is not reached, no action is taken. In this example, if this value is higher than or equal to 3, it is deduced therefrom that the debouncing is not properly adjusted and that it is necessary to increase the debouncing value. Thus, during a multiple or extended depression on the key Tn, a higher number of pulses will be removed, and the user will not resort any longer—or will less resort—to the key for cancelling the key Tn. Then, in a step 205, the new debouncing value to be assumed is determined, for example by deciding to apply a stepped increase of this value, each step having a value of 25 milliseconds, while ensuring that the debouncing value does not exceed a limit value, for example 200 milliseconds. A control for incrementing the debouncing value is then communicated to the responsiveness management module 104.

Figure 3:
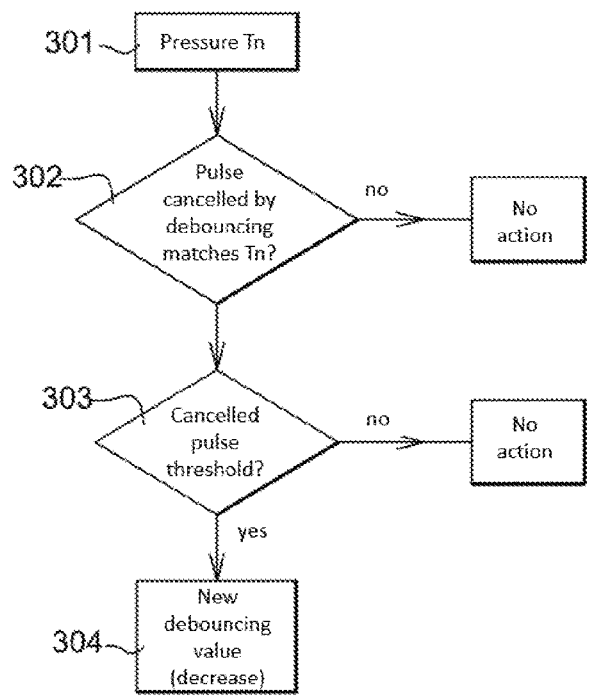
in FIG. 3, a block diagram illustrating a second example of implementing the method according to the invention.

In FIG. 3, it is considered that the responsiveness management module 104 implements the debouncing system 105. In this example, in a first step 301, a first repeated or extended pressure of a key Tn of the piece of equipment 101 is detected.

In a following step 302, it is detected whether the last pulse removed by the debouncing system was a pulse corresponding to a depression on the key Tn considered. If not, no action is taken. If yes, if the last pulse removed by the debouncing system was a pulse corresponding to a depression on the key Tn considered, in a following step 303, the number of pulses immediately removed before depressing the key Tn is compared to a threshold value determined beforehand. This number is higher than or equal to 1. If the threshold value is not reached, no action is taken. In this example, if this value is higher than or equal to 3, it is deduced therefrom that the debouncing is not properly adjusted and that it is necessary to decrease the debouncing value. Thus, during a multiple or extended depression on the key Tn, less—or even no—pulses will be removed, and the user will not have to depress again on the key Tn any longer for taking the accurate number of controls associated with the key Tn he/she wishes to execute into account.

Then, in a step 304, the new debouncing value to be assumed is determined, for example by deciding to apply a stepped decrease of this value, each step having a value of 25 milliseconds, while ensuring that the debouncing value does not fall under a limit value, for example 40 milliseconds. A control for decrementing the debouncing value is then communicated to the responsiveness management module 104.

The modification of the debouncing value, when it has to be modified by the method according to the invention, is applicable to the key Tn considered which caused triggering of this adaptation, and advantageously to a set of keys of the piece of equipment 101, set to which the key Tn considered belongs. This set for example consists of keys disposed on a same zone of the surface of the piece of equipment, or keys associated with similar controls (controls dedicated to the sound level change, alphanumeric keys . . . ).

Figure 4:
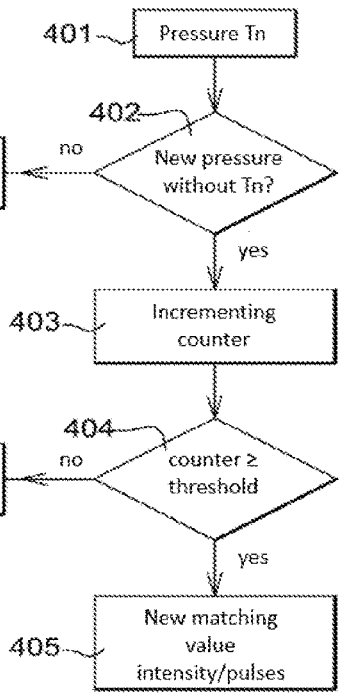
in FIG. 4, a block diagram illustrating a third example of implementing the method according to the invention.
Figure 5:
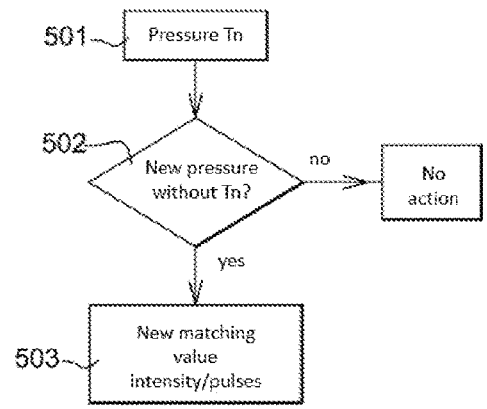
in FIG. 5, a block diagram illustrating a fourth example of implementing the method according to the invention.

In FIGS. 4 and 5, it is considered that the responsiveness management module 104 implements the so-called intensity interpreting system 106.

In the example illustrated in FIG. 4, in a first step 401, a first pressure of a key Tn of the equipment 101 is detected with a given intensity.

In a following step 402, it is detected whether the pressure of the key Tn is immediately followed by a depression on a key for cancelling the key Tn. If not, no action is taken.

If the pressure of the key Tn is actually immediately followed by a depression on the cancel key, by incrementing a counter in a step 403, the number of cancel controls thereby received to cancel the pressure on the key Tn is counted. The counter is reset as soon as a key other than the key for cancelling the key Tn is depressed.

In a following step 404, the number of controls for cancelling the preceding counter is compared to a threshold value determined beforehand. This number is higher than or equal to 1. If the threshold value is not reached, no action is taken. In this example, if this value is higher than or equal to 3, it is deduced therefrom that the intensity interpreting system 106 is not properly adjusted, that it is necessary to decrease, for a given depressing intensity on the control key considered, the number of repetitions of said control to be applied in the electronic device 100 when said control key Tn considered is depressed.

Then, in a step 405, the new matching value between a given depressing intensity and the repetition number of controls to be considered for this intensity is determined. A corresponding decrease control is then communicated to the responsiveness management module 104.

In the example illustrated in FIG. 5, this example, in a first step 301, a first extended pressure of a key Tn of the piece of equipment 101 is detected.

In a following step 502, it is detected whether the next pressure on a key is again a pressure on the key Tn. If not, no action is taken. If yes, it is deduced therefrom that the intensity interpreting system 106 is not properly adjusted, that is necessary to increase, for a given depressing intensity on the control key considered, the number of repetitions of said control to be applied in the electronic device 100 when said control key Tn considered is depressed.

Then, in a step 503, the increase to apply is determined. An adapted control is then communicated to the responsiveness management module 104.

The invention claimed is:

1. A method for parameterising the responsiveness of an electronic device observed after the electronic device has received a control signal emitted from a neighbouring monitoring piece of equipment comprising a plurality of control keys, said method comprising:

receiving by the electronic device one or more control signals emitted by the neighbouring monitoring piece of equipment, said one or more control signals being associated with a depression of the one or more plurality of control keys by a user of the neighbouring monitoring piece of equipment, the neighbouring monitoring piece of equipment being distant from the electronic device;

analysing operations of depressing the one or more control keys by the user of said neighbouring monitoring piece of equipment based on the one or more control signals received by the electronic device;

establishing by the electronic device a usage profile associated with said user of the neighbouring monitoring piece of equipment based on said analysing, the usage profile comprising information relative to a frequency of depressing the one or more control keys by said user and/or a depressing intensity of the one or more control keys by said user; and adapting a responsivity parameter of the electronic device as a function of the usage profile established in connection with the user, the responsiveness parameter being a debouncing period of time, or a parameter having a value which is correlated with the intensity of depressing a control key considered of the neighbouring monitoring piece of equipment.

2. The method according to claim 1, wherein the debouncing period of time is associated with a debouncing system, said debouncing period of time being assigned to a set of keys among the plurality of control keys of the neighbouring monitoring piece of equipment.

3. The method according to claim 2, wherein:
the step of establishing a usage profile comprises the operation of detecting a first sequence consisting in depressing a control key considered immediately followed by a step of cancelling said control signal;
the step of adapting the responsiveness parameter thereby consisting in modifying the debouncing period of time, by increasing it, for at least one of the control keys considered of the first sequence.

4. The method according to claim 3, wherein depressing the cancel key is consecutively repeated three times before conducting the step of adapting the responsiveness parameter.

5. The method according to claim 2, wherein:
the step of establishing a usage profile comprises the operations of detecting:
a second sequence consisting in an extended depression on a control key considered or successive depressions on the control key considered;
an operation of removing by the debouncing system, at least one pulse caused by said extended depression or by said successive depressions on the control key considered;
a new depression on the control key considered causing a pulse not removed by the debouncing system, said new depression occurring without the occurrence of any other depression on a key other than the key considered since the removal operation;
the step of adapting the responsiveness parameter thereby consisting in modifying the debouncing period of time, by decreasing it, for at least the control key considered.

6. The method according to claim 5, wherein the number of pulses removed by the debouncing system is higher than or equal to three.

7. The method according to claim 2, wherein adapting the responsiveness parameter consists in modifying the debouncing period of time for a plurality of control keys associated by the debouncing system with each control key considered.

8. The method according to claim 2, wherein modifying the debouncing period of time consists in a stepped modification, each step being between ten and twenty-five milliseconds.

9. The method according to claim 2, wherein the debouncing period of time to be applied to at least one control key considered is adapted as a function of measures established between consecutive pressures among different control keys to which said control key considered belongs.

10. The method according to claim 1, wherein the responsiveness parameter being the parameter whose value is correlated with the intensity of depressing a control key considered of the neighbouring monitoring piece of equipment, said value gives a number of repetitions of the control associated with the control key considered to be applied in the electronic device when said control key considered is depressed.

11. The method according to claim 10, wherein:
the step of establishing a usage profile comprises the operation of detecting a third sequence consisting in depressing a control key considered immediately followed by depressing a key of cancelling said control;
the step of adapting the responsiveness parameter thereby consisting in modifying, by decreasing it, for a given intensity of depressing the control key considered, the number of repetitions of said control to be applied in the electronic device when said control key considered is depressed.

12. The method according claim 11, wherein depressing the cancel key is consecutively repeated three times before conducting the step of adapting the responsiveness parameter.

13. The method according to claim 10, wherein:
the step of establishing a usage profile comprises the operation of detecting a fourth sequence consisting in an extended depression on a control key considered, followed by a new depression on said control key considered;
the step of adapting the responsiveness parameter thereby consisting in modifying, by increasing it, for a given intensity of depressing the control key considered, the number of repetitions of said control to be applied in the electronic device when said control key considered is depressed.

14. An electronic device adapted for implementing the method according to claim 1, for parameterising the responsiveness of said electronic device observed after the electronic device has received a control emitted from a neighbouring monitoring piece of equipment comprising a plurality of control keys, said device comprising
means for establishing a usage profile of the neighbouring monitoring piece of equipment by an operation of analysing operations of depressing the control keys of said neighbouring monitoring piece of equipment; and
means for adapting a responsiveness parameter of the electronic device as a function of the usage profile established.

* * * * *